US007236213B2

United States Patent
Hoshino

(10) Patent No.: US 7,236,213 B2
(45) Date of Patent: Jun. 26, 2007

(54) RECEIVING APPARATUS AND RECEIVING METHOD OF REDUCED POWER CONSUMPTION FOR RECEIVING A BROADCAST TRANSMISSION

(75) Inventor: Hironobu Hoshino, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 445 days.

(21) Appl. No.: 10/689,730

(22) Filed: Oct. 22, 2003

(65) Prior Publication Data
US 2004/0080675 A1    Apr. 29, 2004

(30) Foreign Application Priority Data
Oct. 24, 2002 (JP) .......................... P2002-310157

(51) Int. Cl.
*H04H 5/63* (2006.01)

(52) U.S. Cl. ..................................... 348/730; 348/837

(58) Field of Classification Search ................ 348/725, 348/731, 730, 553, 570, 837, 838; 455/343.1, 455/343.2, 556.1; 375/316, 348
See application file for complete search history.

(56) References Cited

U.S. PATENT DOCUMENTS

| | | | | |
|---|---|---|---|---|
| 3,584,307 A | * | 6/1971 | Hewie ..................... 455/163.1 |
| 4,281,349 A | * | 7/1981 | George ........................ 348/733 |
| 5,144,296 A | * | 9/1992 | DeLuca et al. ............ 340/7.35 |
| 5,553,019 A | * | 9/1996 | Sandvos et al. ....... 365/185.04 |
| 5,701,599 A | * | 12/1997 | Aihara ..................... 455/186.1 |
| 5,905,544 A | * | 5/1999 | Lee .............................. 348/730 |
| 5,966,186 A | * | 10/1999 | Shigihara et al. ........... 348/570 |
| 5,969,634 A | * | 10/1999 | Takashima et al. ........ 340/7.34 |
| 6,515,716 B1 | * | 2/2003 | Suzuki et al. ............... 348/730 |
| 6,593,975 B1 | * | 7/2003 | Oh .............................. 348/730 |
| 6,650,376 B1 | * | 11/2003 | Obitsu ........................ 348/730 |
| 6,731,346 B1 | * | 5/2004 | Nonomura et al. ......... 348/554 |
| 6,741,293 B1 | * | 5/2004 | Obuchi ....................... 348/554 |
| 6,757,028 B2 | * | 6/2004 | Yamamoto .................. 348/731 |

FOREIGN PATENT DOCUMENTS

JP    2000-217087 A    8/2000

* cited by examiner

*Primary Examiner*—Victor R. Kostak
(74) *Attorney, Agent, or Firm*—Sughrue Mion, PLLC

(57) ABSTRACT

A receiving apparatus that is capable of effectively reducing power consumption in the receiving state. The receiving apparatus is provided with: an RF tuner, digital-demodulation unit, error-correction unit, demultiplexing unit and decoding unit. A control unit determines whether or not processing of the signal by the RF tuner, digital-demodulation unit, error-correction unit, demultiplexing unit or decoding unit is possible, and when it determines that signal processing is not possible, it controls switches such that operation in the corresponding part and after the corresponding part stops.

16 Claims, 2 Drawing Sheets

RECEIVING APPARATUS AND RECEIVING METHOD OF REDUCED POWER CONSUMPTION FOR RECEIVING A BROADCAST TRANSMISSION

BACKGROUND OF THE INVENTION

1. Field of the Invention

This invention relates to a receiving apparatus and receiving method for receiving a broadcast transmission.

2. Description of the Related Art

A digital-broadcast receiving apparatus that lowers power consumption when in the waiting state has been known as a receiving apparatus for receiving a broadcast transmission that is capable of reducing the power consumption.

However, in the case of a installing a receiving apparatus in a vehicle, it is desired that the power consumption be suppressed as much as possible, and in order to accomplish that, it is necessary to reduce the power consumption in the receiving state (including the sate of attempting to receive a specific broadcast transmission) not only intermittently but also when receiving a continuous broadcast.

This type of receiving a broadcast transmission is represented by the apparatus disclosed by Japanese Patent-laid Open (KOKAI) publication No. 2000-217087.

SUMMARY OF THE INVENTION

The object of this invention is to provide a receiving apparatus that is capable of effectively reducing power consumption in the receiving state.

The above object of the present invention can be achieved by a receiving apparatus of the present invention. The receiving apparatus is provided with: a signal-processing unit for processing the received signal; a judgment device for determining whether or not it is possible to process the signal by the signal-processing unit; and a control device for stopping operation of the signal-processing unit or of later stages after the signal-processing unit when the judgment device determines it is not possible for the signal-processing unit to process the signal.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In one aspect of the present invention can be achieved by the receiving apparatus of the present invention. The receiving apparatus is, wherein: the control device comprising; a power-supply-cut-off device for cutting the power supply to the signal-processing unit or the later stages; and the control device stops operation of the signal-processing unit or the later stages by cutting the power supply by the power-supply-cut-off device.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In another aspect of the present invention can be achieved by the receiving apparatus of the present invention. The receiving apparatus is, wherein the receiving apparatus further comprising; a memory device for storing judgment criteria; and wherein the judgment device determines whether or not the signal processing is possible based on the judgment criteria stored in the memory device.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the receiving apparatus further comprising a criteria-change device for changing the judgment criteria based on data contained in the received signal.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the signal-processing unit is a tuner that amplifies a signal received by an antenna.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the signal-processing unit is a demodulation unit that extracts data by demodulating the received signal.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the signal-processing unit is an error-correction unit for removing code error.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the signal-processing unit is a demultiplexing unit that separates sent data that have been multiplexed.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the signal-processing unit is a decoding unit that returns the encoded data source to the original data.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the control device performs control such as to stop unnecessary operation according to instructions from the user.

According to the present invention, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the judgment device determines whether or not signal processing is possible based on the receiving power.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the judgment device determines whether or not signal processing is possible based on whether or not synchronization is obtained during demodulation.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the judgment device determines whether or not signal processing is possible based on the bit-error rate during error correction.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

In further aspect of the present invention can be achieved by the receiving apparatus of the present invention. The receiving apparatus is, wherein the judgment device determines whether or not signal processing is possible based on the bit-error rate during decoding.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus.

Moreover, data from outside the apparatus, such as the vehicle speed or receiving location, influences the ON/OFF control of the apparatus, so it is possible to constantly obtain an operating status that is suitable to the receiving conditions.

The above object of the present invention can be achieved by a receiving method of receiving a broadcast transmission of the present invention. The receiving method is provided with: a signal-processing process of processing the received signal; a judgment process of determining whether or not it is possible to process the signal in the signal-processing process; and a control process of stopping the operation of stages after the signal-processing unit, which executes signal processing in the signal-processing process, when it is determined in the judgment process that the signal processing is not possible.

According to the present invention, by detecting the operating status of each part of the receiving apparatus to determine whether or not the signal can be processed from that operating status, and by turning OFF switches according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, data from outside the apparatus, such as the vehicle speed or receiving location, influences the ON/OFF control of the apparatus, so it is possible to constantly obtain an operating status that is suitable to the receiving conditions.

DESCRIPTION OF THE PREFERRED EMBODIMENTS

An embodiment of the receiving apparatus of this invention will be explained below with reference to FIG. 1 and FIG. 2.

Figure 1:
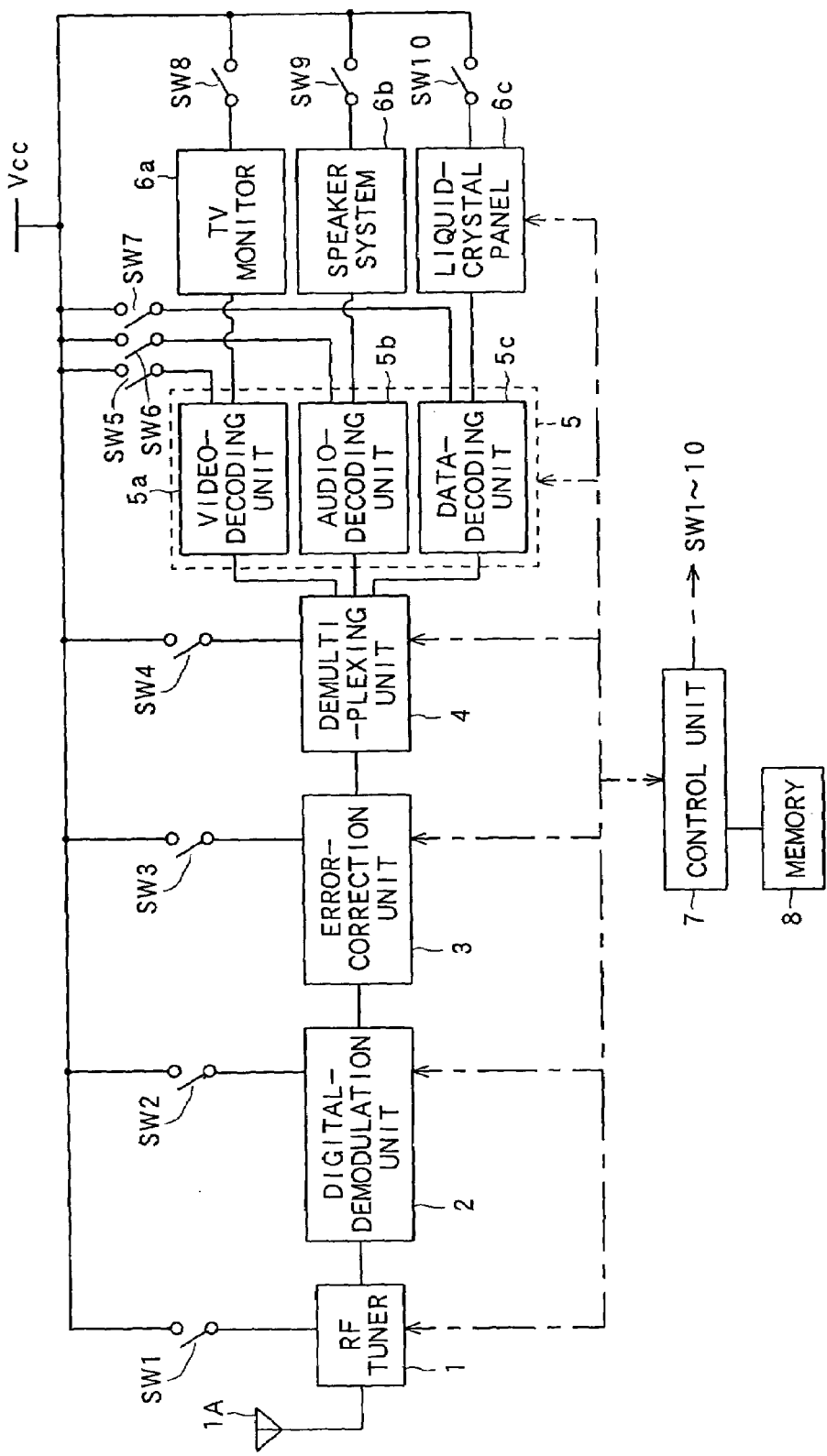
FIG. 1 is a block diagram showing the construction of the receiving apparatus of an embodiment of the invention.

FIG. 1 is a block diagram showing the construction of the receiving apparatus of an embodiment of the invention. As shown in FIG. 1, the receiving apparatus 100 of this embodiment is provided with: an RF tuner 1 that receives the signal received by the antenna 1A; a digital demodulator 2 that receives the output signal from the RF tuner 1; an error-correction unit 3 that corrects errors in the output signal from the digital demodulator 2; a demultiplexing unit 4 that demultiplexes the output signal from the error-correction unit 3; and a decoding unit 5 that decodes the digital signal that is output from the demultiplexing unit 4. The decoding unit 5 is provided with: a video-decoding unit 5a, an audio-decoding unit 5b and data-decoding unit 5c that decode video signals, audio signals and various kinds of data such as text data, respectively. The output signal from the video-decoding unit 5a is input to a TV monitor 6a, the output signal from the audio-decoding unit 5b is input to a speaker system 6b and the output signal from the data-decoding unit 5c is input to a liquid-crystal panel 6c. The TV monitor 6a, speaker 6b and liquid-crystal panel 6c function as output devices for video, audio and various kinds of data, respectively.

The RF tuner 1 performs the functions of amplifying the weak signal received by the antenna 1A to the level necessary for demodulating the signal, and converting the signal to a signal that can be input to the digital demodulation unit 2. The digital demodulation unit 2 has the function of synchronizing the carrier wave and performing symbol timing, and obtaining the information interwoven in the amplitude and phase of the carrier wave. The error-correction unit 3 has the function of removing code errors that were generated due to effects of noise added along the transmission path by adding error-correction code on the sending side and restoring the signal to the original signal. The demultiplexing unit 4 has the function of returning the sent data, which was combined into one packet by the multiplexing unit, to the original video and audio signals. The decoding unit 5 executes decoding, which is an operation of returning the encoded source data to the original data.

The receiving apparatus 100 is provided with: a control unit 7 that switches between operating or not operating the parts of the receiving apparatus 100 based on the data obtained in each of the parts of the apparatus or from outside the apparatus; and a memory 8 that stores the data necessary for the control unit 7 to perform the control process.

Furthermore, as shown in FIG. 1, the receiving apparatus 100 is provided with switches SW1 to SW10, and these switches SW1 to SW10 are respectively installed in the power-supply lines for the RF tuner 1, digital-demodulation unit 2, error-correction unit 3, demultiplexing unit 4, video-decoding unit 5a, audio-decoding unit 5b, data-decoding unit 5c, TV monitor 6a, speaker system 6b and liquid-crystal panel 6c. The control unit 7 switches the switches SW1 to SW10 ON/OFF according to data from each of the parts of the apparatus or data from outside the apparatus in order to control the receiving apparatus 100 so that it does not perform any unnecessary operations. By turning OFF the switches SW1 to SW10, it is possible to turn OFF the power supply between the corresponding part and the circuit and to stop operation between that part and the circuit.

Next, the operation of the receiving apparatus 100 of this embodiment will be explained with reference to FIG. 2. FIG. 2 is a flowchart showing the operation of the receiving apparatus 100, and the processes of each step of the flowchart are executed based on control from the control unit 7.

Figure 2:
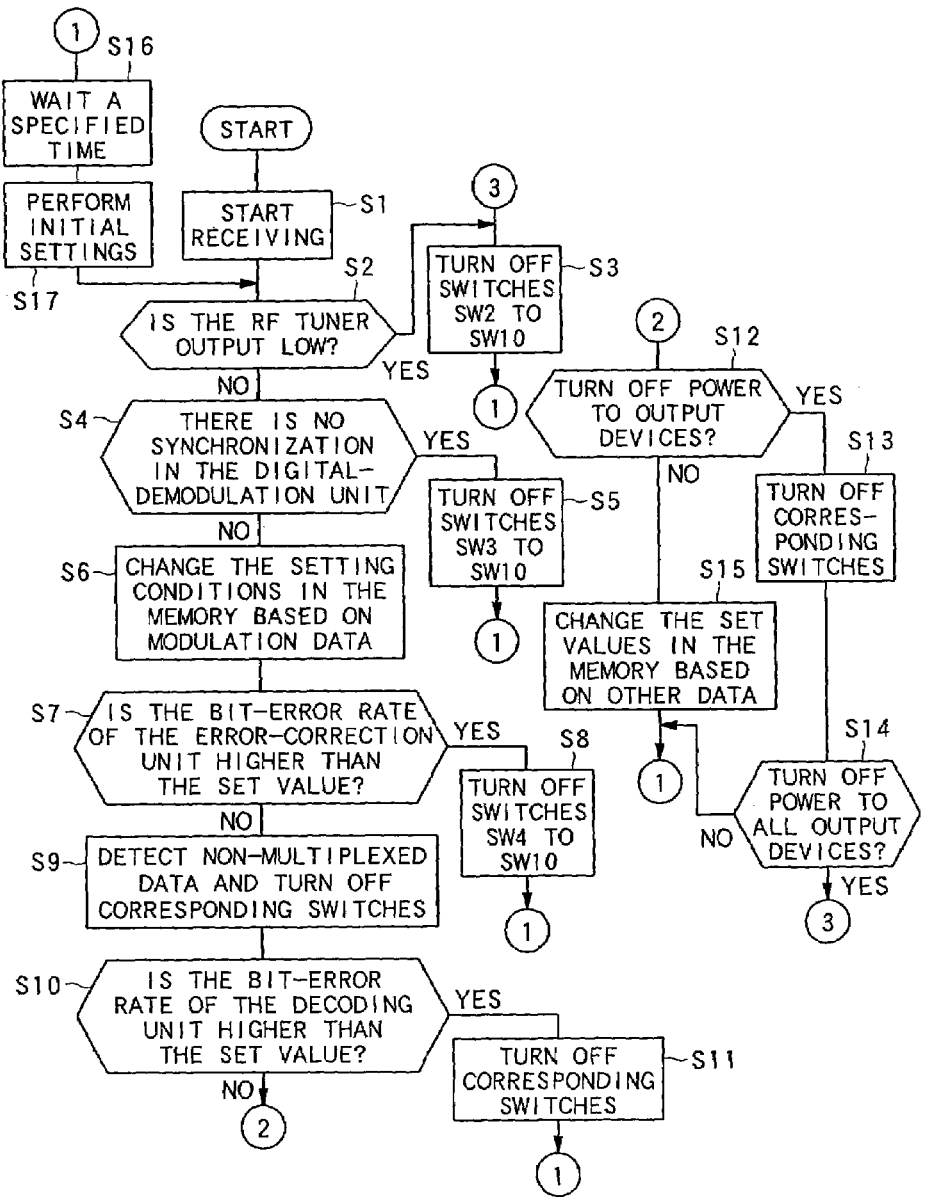
FIG. 2 is a flowchart showing the operation of the receiving apparatus.

In the processing shown in FIG. 2, receiving of a certain broadcast transmission starts (step S1). At this time, all of the switches SW1 to SW10 are set to the ON state. Next, the control unit 7 compares the level of the output signal from the RF tuner 1, or in other words the receiving power, and a set value that is stored in the memory 8, and determines whether or not the receiving power is less than the set value (step S2). Here, the set value is the minimum receiving power that can be received. The receiving power is sent to the control unit 7 as data from the RF tuner 1, and the control unit 7 compares the it with the set value stored in the memory 8.

When the judgment in step S2 is determined to be 'YES', the control unit 7 turns OFF switches SW2 to SW10 (step S3) and then advances to step S16. When the judgment in step S2 is determined to be 'YES', it means the receiving power is less than the value for the minimum receivable power, so it is not possible to receive the broadcast transmission. Therefore, in this case, by turning the switches SW2 to SW10 OFF, operation of all of the parts of the receiving apparatus 100 except the RF tuner 1 is stopped, and power consumption is reduced.

On the other hand, when the judgment in step S2 is determined to be 'NO', it indicates that the value of the receiving power is within the range that it may be possible to receive the intended broadcast transmission, so in this case the control unit 7 advances to step S4 without turning OFF the switches SW2 to SW10.

It is possible to use a numerical value such as the receiving sensitivity of the signal meter as the receiving power. It is also possible to obtain a value for the receiving power based on results after performing digital processing for the received broadcast wave.

In step S4, the digital demodulation unit 2 determines whether or not there is synchronization. The control unit 7 executes this process based on data from the digital demodulation unit 2. When the judgment of step S4 is 'YES', the control unit 7 turns OFF switches SW3 to SW10 (step S5) and advances to step S16. When the judgment in step S4 is 'YES', then synchronization was not obtained in the digital demodulation unit 2, and normal operation in the digital demodulation unit 2 and the steps after the digital demodulation unit 2 cannot be expected. Therefore, in this case, the control unit 7 turns OFF switches SW3 to SW10 and stops operation of the digital demodulation unit 2 and the steps after the digital demodulation unit 2 to reduce power consumption.

When the judgment in step S4 is 'NO', it indicates that synchronization is maintained in the digital demodulation unit 2, and that it may be possible to executed operation normally, so in this case the control unit 7 advances to step S6 without turning OFF switches SW3 to SW10.

In step S6, the control unit 7 changes the setting conditions (judgment standards) that are stored in the memory 8 based on modulation data from the received signal. The modulation data contains the modulation method and carrier interval or guard interval of the received broadcast wave. It is also possible to use error-correction code or a pilot signal that is added to the received broadcast wave as modulation data.

As examples of the modulation method, QPSK (Quadrature Phase Shift Keying), 16QAM (Quadrature Amplitude Modulation) or 64QAM is possible.

The minimum receiving power that was used for the judgment in step S2 can be used as an example of the setting condition that is changed according to the modulation method. For example, when the modulation method of the broadcast wave to be received is different, the receiving power necessary for receiving the wave is different, so the setting condition is changed in order to switch the minimum receiving power to correspond to the modulation method. By changing the setting condition in this way, it is possible to make the judgment in step S2 more efficient.

It is also possible to include the bit-error rate of the error-correction unit 3 (step S7) or the bit-error rate of the decoding unit 5 (step S10), which will be explained later, in the setting conditions. By changing these setting conditions according to the modulation data, it is possible to make the judgment in step S7 and step S10 more efficient.

Next, the control unit 7 determines whether or not the bit-error rate of the error-correction unit 3 is greater than a set value (step S7). Here, the control unit 7 executes the process of comparing the bit-error rate send from the error-correction unit 3 with the set value stored in the memory 8. When this judgment is determined to be 'YES', the error cannot be properly corrected by the error-correction unit 3, so normal operation in the demultiplexing unit 4 and later stages cannot be expected. Therefore, in this case, the control unit 7 turns OFF the switches SW4 to SW10 and stops the operation in the demultiplexing unit 4 and stages after the demultiplexing unit 4 to reduce power consumption (step S8). Then the control unit 7 advances to step S16.

When the judgment in step S7 is determined to be 'NO', the control unit 7 does not turn OFF the switches SW4 to SW10, but detects data that is not multiplexed and then turns OFF the corresponding switches in order to stop operation of unnecessary circuits (step S9). In the process of step S9, the control unit 7 determines whether or not there is video data, audio data or other various data based on data from the demultiplexing unit 4. The control unit 7 then turns OFF the switches necessary for displaying or reproducing signals or data in the received signal that are not multiplexed. For example, in the case that the video signal in the received signal is not multiplexed, the control unit 7 can stop the operation of the video-decoding unit 5a and the TV monitor 6a by turning OFF switch SW5 and switch SW8. In the case that the audio signal in the received signal is not multiplexed, the control unit 7 can stop the operation of the audio-decoding unit 5b and the speaker system 6b by turning OFF switch SW6 and switch SW9. Moreover, in the case that various data are not multiplexed, the control unit 7 can stop the operation of the data-decoding unit 5c and the liquid-crystal panel 6c by turning OFF switch SW7 and switch SW10. In this embodiment, by stopping the operation of circuits that are necessary for reproducing or displaying signals or data that are not multiplexed, it is possible to prevent power from being consumed needlessly.

Next, the control unit 7 determines whether or not the bit-error rate from the decoding unit 5 is greater than a set value (step S10). Here, the control unit 7 executes a process of comparing the bit-error rates sent from the video-decoding unit 5a, audio-decoding unit 5b and data-decoding unit 5c of the decoding unit 5 with set values stored in the memory 8. When this judgment is determined to be 'YES', it indicates that proper decoding cannot be executed by the decoding unit 5, so in this case, the control unit 7 turns OFF the corresponding switches to reduce power consumption (step S11). For example, in the case that the bit-error rate send from the video-decoding unit 5a is greater than a set value, the control unit 7 turns OFF switch SW8 and stops operation of the TV monitor 6a. In the case that the bit-error rate sent from the audio-decoding unit 5b is greater than a set value, the control unit 7 turns OFF switch SW9 and stops operation of the speaker system 6b. Moreover, in the case that the bit-error rate sent from the data-decoding unit 5c is greater than a set value, the control unit 7 turns OFF switch SW10 and stops operation of the liquid-crystal panel 6c.

When the judgment in step S10 is determined to be 'NO', the control unit 7 determines whether or not to turn OFF the power to some output devices without turning the corresponding switches OFF (step S12). When the judgment is determined to be 'YES', the control unit 7 turns OFF the corresponding switches (step S13) and advances to step S14. The user turns ON/OFF the output devices that are the object of the judgment in step 12. In step S13, the control unit 7 turns OFF the switches corresponding to the output devices whose power was turned OFF by the user. In other words, when the power to the TV monitor 6a is turned OFF, the control unit 7 turns OFF switch SW8; when the power to the speaker system 6b is turned OFF, the control unit 7 turns OFF switch SW9; and when the power to the liquid-crystal panel 6c is turned OFF, the control unit 7 turns OFF switch SW10.

Next, in step S14 the control unit 7 determines whether or not the power to all of the output devices, or in other words, the TV monitor 6a, speaker system 6b and liquid-crystal panel 6c is turned OFF, and when the judgment is determined to be 'YES', it advances to step S3, and when the judgment is determined to be 'NO', it advances to step S16. Here, when the power to all of the output devices is OFF, it is useless to operate the receiving apparatus 100. Therefore, in this case, the control unit 7 turns OFF switches SW2 to SW10 and to stop operation in stages after the RF tuner (step S3).

On the other hand, when the judgment in step S12 is determined to be 'NO', the control unit 7 changes the setting conditions stored in the memory 8 based on data obtained from outside the receiving apparatus 100 (step S15), and advances to step S16. In step S15, vehicle speed data output from the vehicle speed sensor, a parking-brake signal that is output when the parking brake is set, or data indicating the receiving location obtained from GPS can be used as the data obtained from outside the receiving apparatus 100. For example, the faster the vehicle speed is the more the receiving location moves in a short period of time, so the receiving state can easily become unstable, and the receiving state becomes stable when the parking brake is set. Also, when the receiving location is near a transmission tower, the receiving power becomes larger, and when the receiving location is in the center of a city, many multipaths occur and the receiving conditions become worse. Therefore, by changing the setting conditions according to the vehicle speed or receiving location, it is possible to more efficiently select whether to operate or not operate parts of the receiving apparatus 100.

The control unit 7 waits a specified time in step S16. Next, the control unit 7 performs initial settings (step S17) and advances to step S2. In the initial settings, the control unit 7 operates the entire receiving apparatus by turning ON switches SW1 to SW10.

In this way, in the processing shown in FIG. 2, the switches SW1 to SW10 are in actuality turned ON/OFF at fixed intervals. Therefore, in the case when the receiving apparatus 100 is installed in a vehicle, it is possible to effectively reduce power consumption by operating only between necessary parts and circuits even when the receiving state changes over time.

As explained above, in this embodiment, by detecting the operating status of each part of the receiving apparatus 100 to determine whether or not the signal can be processed from that operating status, and by turning OFF the switches SW1 to SW10 according to the results of the judgment, control is performed to stop operation of the parts whose operating status was detected or of the stages after those parts. Therefore, it is possible to efficiently eliminate unnecessary operation and to effectively reduce the power consumption of the overall apparatus. Moreover, in this embodiment, data from outside the apparatus, such as the vehicle speed or receiving location, influences the ON/OFF control of the switches SW1 to SW10, so it is possible to constantly obtain an operating status that is suitable to the receiving conditions.

In the explanation above, an example of a receiving apparatus that receives a digital broadcast transmission was explained, however, the invention can also be applied to a receiving apparatus that receives an analog broadcast such as in the case of an AM radio, FM radio, television or the like, or it could be combined with a digital apparatus. In the case of an analog broadcast, in addition to the broadcast method and receiving power, it is also possible to change the setting conditions stored in the memory 8 based on the audio mode, such as stereo, monaural, bilingual, etc.

Also, it is possible apply the receiving apparatus of this invention to a so-called software receiving apparatus. A software receiving apparatus is a receiving apparatus that is constructed such that the operating process is specified by a program. In the case of applying the receiving apparatus of this invention to a software receiving apparatus, it is possible to perform the processes of determining whether or not to process the signal between a certain part and circuit by a program. In the case when it is determined that the signal cannot be processed, the process of stopping operation between a certain part and circuit or in a later stage can also be performed by a program.

Furthermore, it is also possible to alter the contents of the program according to data that is sent from the receiving apparatus to a server. In this case, the data sent from the receiving apparatus to the server can be the current receiving position or an instruction from the user, and it is sent to the server, and then based on this data, it is possible to send instructions for changing the program or a new program itself from the server to the receiving apparatus. In this case, various data and programs can be separated and stored on the server and receiving apparatus according to conditions such as storage capacity, processing speed, etc. Therefore, it is possible to make the receiving apparatus more compact and to perform more detailed processing.

The RF tuner 1 of the embodiment described above corresponds to a 'signal-processing unit' described in the claims of the invention, the digital demodulation unit 2 corresponds to a 'signal-processing unit', the error-correction unit 3 corresponds to a 'signal-processing unit', the demultiplexing unit 4 corresponds to a 'signal-processing unit', the decoding unit 5 corresponds to a 'signal-processing unit', the control unit 7 corresponds to a 'control means' and 'criteria-change means', the memory 8 corresponds to a 'memory means', and the switches SW1 to SW10 correspond to a 'power-supply-cut-off means'.

The entire disclosure of Japanese Patent Application No. 2002-310157 filed on Oct. 24, 2002 including the specification, claims, drawings and summary is incorporated herein by reference in its entirety.

What is claimed is:

1. A receiving apparatus for receiving a broadcast transmission comprising:
    a signal-processing unit for carrying out processing the received signal at a plurality of stages in a predetermined order;
    a judgment device for determining whether or not it is normal to process the signal in at least one of the stages; and
    a control device for controlling power supply to make the signal-processing unit carry out the received signal processing, on each stage, only when the judgment device determined that an immediately-prior stage is normally carried out.

2. The receiving apparatus according to claim 1, wherein unnecessary operation of the receiving apparatus is eliminated and power consumption is reduced by controlling the power supply to make the signal-processing unit carry out the received signal processing, on each stage, only when the judgment device determined that an immediately-prior stage is normally carried out.

3. The receiving apparatus according to claim 1, wherein:
    one of the stages is executed by a tuner that amplifies a signal received by an antenna,
    the judgment device determines whether or not it is normal to process the signal at the tuner based on the receiving power of the tuner, and
    the control device controls the power supply to make the signal-processing unit carry out the received signal processing, on later stages after the tuner stage, only when the judgment device determined that the tuner stage is normally carried out.

4. The receiving apparatus according to claim 3, wherein the judgment device further comprising a memory device for storing judgment criteria; and wherein
the judgment device determines whether or not the signal processing normal based on the judgment criteria stored in the memory device.

5. The receiving apparatus according to claim 4, wherein the receiving apparatus further comprising a criteria-change device for changing the judgment criteria based on data contained in the received signal.

6. The receiving apparatus according to claim 1, wherein one of the stages is executed by a demodulation unit that demodulates a signal received by the demodulation unit,
the judgment device determines whether or not it is normal to process the signal at the demodulation unit based on whether or not synchronization is obtained during demodulation, and
the control device controls the power supply to make the signal-processing unit carry out the received signal processing, on later stages after the demodulation unit stage, only when the judgment device determined that the demodulation unit stage is normally carried out.

7. The receiving apparatus according to claim 6, wherein the judgment device further comprising a memory device for storing judgment criteria; and wherein
the judgment device determines whether or not the signal processing is possible based on the judgment criteria stored in the memory device.

8. The receiving apparatus according to claim 7, wherein the receiving apparatus further comprising a criteria-change device for changing the judgment criteria based on data contained in the received signal.

9. The receiving apparatus according to claim 1, wherein one of the stages is executed by an error-correction unit for removing code error,
the judgment device determines whether or not it is normal to process the signal at the error-correction unit based on a bit-error rate during error correction, and
the control device controls the power supply to make the signal-processing unit carry out the received signal processing, on later stages after the demodulation unit stage, only when the judgment device determined that the demodulation unit stage is normally carried out.

10. The receiving apparatus according to claim 9, wherein the judgment device further comprising a memory device for storing judgment criteria; and wherein
the judgment device determines whether or not the signal processing is possible based on the judgment criteria stored in the memory device.

11. The receiving apparatus according to claim 10, wherein
the receiving apparatus further comprising a criteria-change device for changing the judgment criteria based on data contained in the received signal.

12. The receiving apparatus according to claim 1, wherein one of the stages is executed by a decoding unit for returning the encoded data source to the original data,
the judgment device determines whether or not it is normal to process the signal at the decoding unit based on a bit-error rate during decoding, and
the control device controls the power supply to make the signal-processing unit carry out the received signal processing, on later stages after the demodulation unit stage, only when the judgment device determined that the demodulation unit stage is normally carried out.

13. The receiving apparatus according to claim 12, wherein
the judgment device further comprising a memory device for storing judgment criteria; and wherein
the judgment device determines whether or not the signal processing is possible based on the judgment criteria stored in the memory device.

14. The receiving apparatus according to claim 13, wherein
the receiving apparatus further comprising a criteria-change device for changing the judgment criteria based on data contained in the received signal.

15. A receiving method of receiving a broadcast transmission comprising:
a signal-processing process of processing the received signal at a plurality of stages in a predetermined order;
a judgment step of determining whether or not it is normal to process the signal in at least one of the stages; and
a control step of controlling power supply necessary for activating each of the stages, only when the judgment step determined that an immediately-prior stage is normally carried out.

16. The receiving method according to claim 15, wherein unnecessary operation is eliminated and power consumption is reduced by controlling the power supply necessary for activating each of the stages, only when the judgment step determined that an immediately-prior stage is normally carried out.

* * * * *